United States Patent [19]

Rodewald et al.

[11] Patent Number: 5,670,939
[45] Date of Patent: Sep. 23, 1997

[54] METHOD FOR EVALUATION OF THE SELF-DIAGNOSIS OF A CONTROLLER IN A MOTOR VEHICLE

[75] Inventors: Andreas Rodewald, Stuttgart; Wolfgang Straub, Deggingen, both of Germany

[73] Assignee: Mercedes-Benz AG, Germany

[21] Appl. No.: 449,663

[22] Filed: May 24, 1995

[30] Foreign Application Priority Data

May 24, 1994 [DE] Germany .................. 44 18 072.1

[51] Int. Cl.⁶ .................................. G08B 29/00
[52] U.S. Cl. ................ 340/514; 340/458; 340/459; 340/438; 340/439; 364/188; 364/146; 364/424.045; 364/424.035
[58] Field of Search .................. 340/458, 459, 340/635, 525, 438, 439; 364/424.04, 424.05, 186, 188, 141, 146

[56] References Cited

U.S. PATENT DOCUMENTS

| | | | |
|---|---|---|---|
| 3,964,302 | 6/1976 | Gordon et al. | 340/525 |
| 4,635,030 | 1/1987 | Rauch | 340/525 |
| 4,926,352 | 5/1990 | Staffe | 364/550 |
| 5,034,894 | 7/1991 | Abe | 364/431.01 |

FOREIGN PATENT DOCUMENTS

| | | |
|---|---|---|
| 0364973A2 | 10/1989 | European Pat. Off. . |
| 0413931A1 | 6/1990 | European Pat. Off. . |
| 2634429A1 | 7/1988 | France . |
| 3810241A1 | 10/1988 | Germany . |
| 2130751 | 9/1983 | United Kingdom . |

OTHER PUBLICATIONS

British Search Report dated Jul. 26, 1995.
"Möglichkeiten komfortabler Testgeräte zur Auswertung der Eigendiagnose von Steuergeräten im Kraftfahrzeug," Dipl.—Ing. D. Nemec, VDI Report No. 687, Sep. 1988, pp. 365–368.

*Primary Examiner*—Jeffery Hofsass
*Assistant Examiner*—Daryl Pope
*Attorney, Agent, or Firm*—Evenson, McKeown, Edwards & Lenahan P.L.L.C.

[57] ABSTRACT

The invention provides a method for evaluating the self-diagnostic system of a controller in a motor vehicle having a control panel with a push-button switch with automatic return, and additional input elements and having a signalling element which is suitable for emitting a flashing code. In order to emit a structured flashing code of fault numbers, the range of possible faults which can be diagnosed is divided into fault classes, the faults within a fault class being assigned fault numbers which can be emitted, separated on the basis of fault classes, by flashing code. A specific fault class is selected by the operator by setting the input elements to a specific position combination which is assigned to the fault class, and operation of the push-button switch (for example, the recirculation push-button in the case of a heating controller).

13 Claims, 2 Drawing Sheets

METHOD FOR EVALUATION OF THE SELF-DIAGNOSIS OF A CONTROLLER IN A MOTOR VEHICLE

BACKGROUND AND SUMMARY OF THE INVENTION

The invention relates to a method for evaluation of the self-diagnostic function of a controller in a motor vehicle.

It is known, for example from ABS controllers in motor vehicles, for a built-in microcomputer to carry out a simple self-diagnostic program (on-board diagnosis) before each start of the engine when the ignition is switched on, and also to monitor the information sources (transmitters, sensors) and electrical actuators during engine operation. In this manner, it is possible to store information concerning even intermittent and temporary events or faults. This self-diagnosis, which is integrated in the controller, essentially checks whether the input signals necessary for satisfactory operation of a controller are present, and whether actuators receive current in the intended time frame. If comprehensive operation of a controller is no longer ensured, illuminating or flashing warning signals inform the driver that a critical defect is present, and that he or she should have the vehicle serviced. The technician in the service garage can call up the current faults or faults stored in a fault memory, in the form of coded flashing signals.

A generic method for evaluating the self-diagnostic system by the emission of a flashing code is disclosed, for example, in the German book: VDI Reports No. 687, which appeared in September 1988, D. Nemec, "Möglichkeiten komfortabler Testgeräte zur Auswertung der Eigendiagnose von Steuergeräten im Kraftfahrzeug" [Options for convenient test equipment for evaluation of the self-diagnosis of controllers in a motor vehicle], pages 365–368. As described therein, the request for the controller to emit the flashing code and the information to be transmitted can be produced by specific confirmation, operating braking or ignition switching-on sequences. "Fault numbers" referring to fault descriptions in the repair manual are transmitted at a frequency of approximately 1 Hertz, using a flashing code. The indicating lights which are installed in the motor vehicle (LEDs, safety lamps etc.) can be used for emitting the flashing code.

The evaluation of the self-diagnostic system, using a flashing code to communicate the results to a system operator or service technician is highly cost-effective and is recommended for controllers having a low level of networking in the vehicle. The operating convenience, however, is actually low. Particularly if a relatively large variety of faults can be diagnosed, so that it must be possible to transfer a corresponding quantity of fault numbers by means of flashing code, reliable identification is difficult.

The object of the present invention is to develop a method of the generic type which can reliably transmit a comprehensive number of faults in a practical manner, by means of flashing code.

This object is achieved according to the invention by dividing the range of possible faults into two or more classes or categories, with the class or category of faults to be checked being selected by the operator or service technician.

One advantage of the invention over the prior art is that readily distinguishable fault diagnoses can be read out as a result of the division of all possible faults into classes (for example, into current and past faults) selected by an operator. The number of fault codes to be displayed by flashing code is thus small. The method according to the invention requires no additional hardware complexity, and is thus very cost-effective.

An advantageous embodiment provides that the entry into the diagnostic mode requires both of the operator's hands for operation, so that accidental entry is precluded.

Other objects, advantages and novel features of the present invention will become apparent from the following detailed description of the invention when considered in conjunction with the accompanying drawings.

DETAILED DESCRIPTION OF THE DRAWINGS

Figure 1:
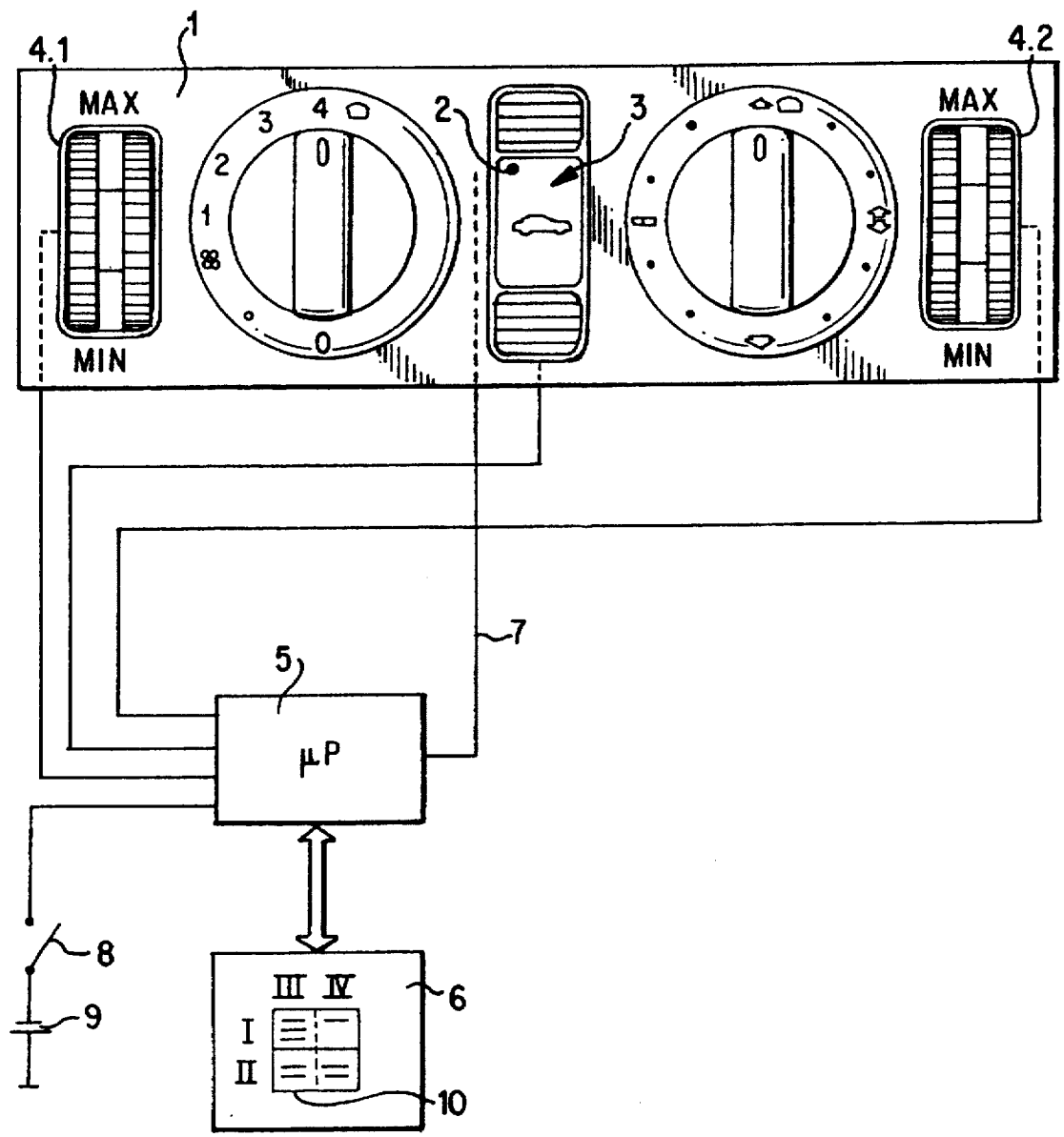
FIG. 1 shows the implementation of the method according to the invention, with respect to a heating controller.

The control panel 1 of the heating controller in FIG. 1 comprises a plurality of input elements (3, 4.1, 4.2) and a signalling element 2, which are used to implement the method according to the invention. The recirculation button 3 for activation of the recirculation ventilation of the interior of the vehicle is designed as a push-button switch with automatic return. The two other input elements 4.1, 4.2 are interrogated upon operation of the recirculation push-button 3, in conjunction with the method according to the invention. The integrated diagnostic program and the emission of flashing code are controlled as a function of the setting of the input elements 4.1, 4.2 (that is, the position combination resulting thereof). A light-emitting diode integrated into the recirculation push-button 3 is used as the signalling element 2 for emitting the flashing code.

The two input elements 4.1, 4.2 are a left-hand temperature selection wheel 4.1 and a right-hand temperature selection wheel 4.2, for controlling the temperature of the left-hand and right-hand halves of the vehicle respectively, in normal operation (temperature regulation). The temperature selection wheels 4.1, 4.2 have end-stop latches so that the limit positions MIN and MAX can be set precisely.

The position of the input elements 3, 4.1, 4.2 is detected by a microprocessor 5 which runs the diagnostic program according to the invention as well as the main program for temperature regulation, and emits a flashing code signal 7 to the signalling element 2 in order to emit flashing code. The microprocessor 5 is fed from a voltage supply 9 via a switch 8, which may be the ignition switch of the vehicle.

The microprocessor 5 interchanges data with a non-volatile fault memory 6 in order to store diagnosed faults therein or to read them out. The faults are divided into at least two fault classes I, II, and a fault number is assigned to each type of fault within a fault class. One possible division is, for example, to distinguish between current faults I and past faults II. The current faults I are recorded immediately before or during the emission of flashing code and are currently present in measurable form, while the past faults II have occurred in the course of a preceding operating interval and have been stored in the fault memory 6 by the self-diagnosis program which is active in the background. The past faults II thus cover statistically and sporadically occurring faults, which can be caused by intermittent contacts or events.

Since, in total, four position combinations are possible by means of the two temperature selection wheels 4.1, 4.2, two further fault classes III, IV can also be provided, which may overlap the first two fault classes I and II. A further distinction between short-circuit faults and continuity faults, left-hand or right-hand vehicle halves, etc. can thus make sense and provide the technician in the garage with a valuable aid. A further option is for the technician to be able to call up additional special test programs using the fault classes III and IV.

Within a fault class, the faults are divided on the basis of fault numbers 10, a first fault number characterizing the fault-free condition. For good clarity, it is advantageous to select a common division of the fault numbers for all the fault classes, for example a division of the fault numbers on the basis of assemblies such as a temperature sensor, cyclically operating valve, recirculation valve, or water pump.

Figure 2:
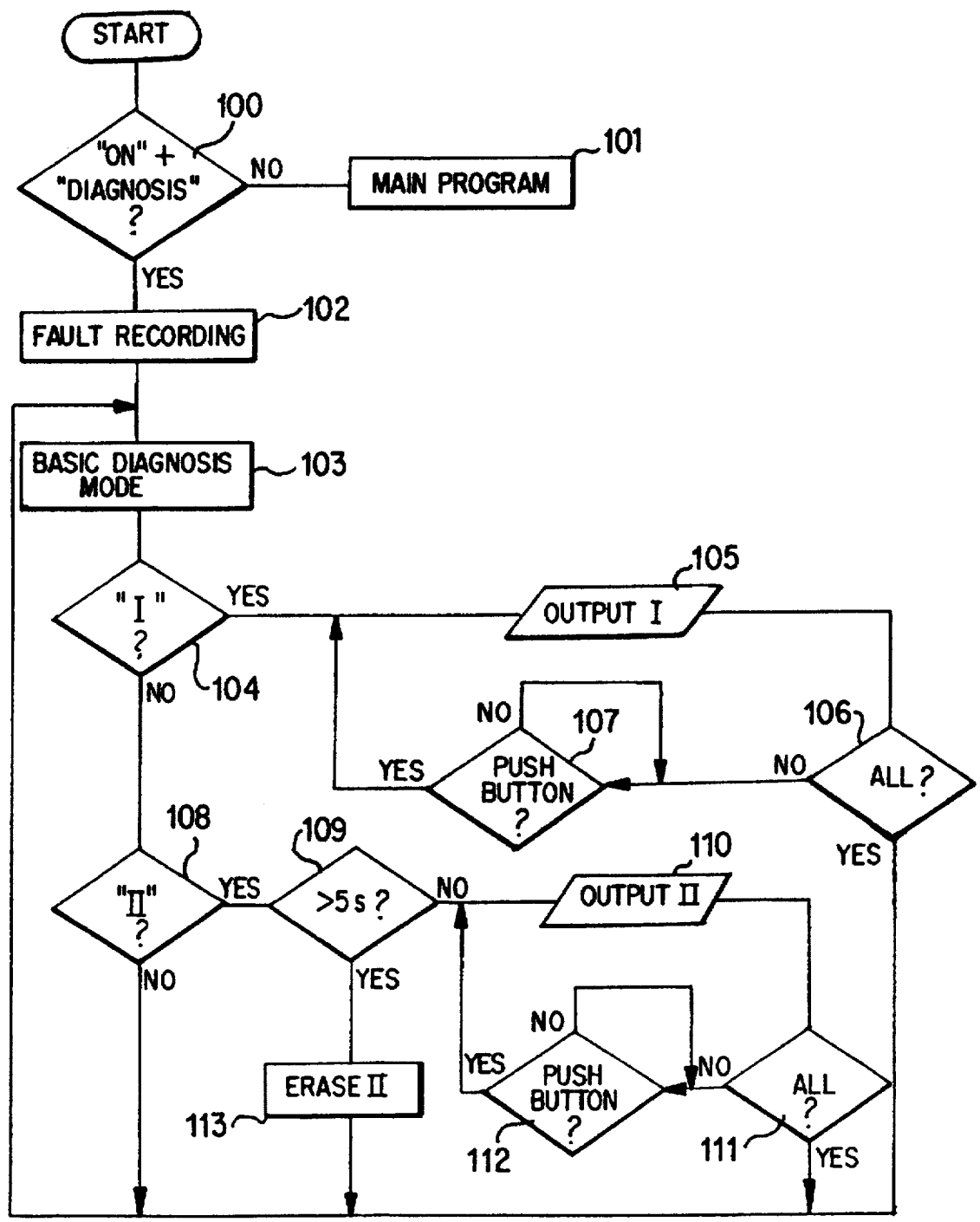
FIG. 2 shows a flow diagram which illustrates the method according to the invention.

The method according to the invention will now be explained with reference to the flow diagram in FIG. 2 and the heating controller in FIG. 1. The exemplary embodiment is limited to the case in which the faults are divided into current faults (fault class I) and past faults (fault class II). An extension of the process to include more fault classes is of course possible without any problems.

Entry into the diagnostic program is made in step 100, with the interrogation of the position combination of the input elements upon switching the controller on by closing the switch 8. If an internal voltage monitoring device records that the "ON" state has been reached upon switching the controller on while the "DIAGNOSIS" position combination is present at the same time, the diagnostic program, steps 102–113, is selected. Otherwise, the main program 101 is selected (for normal operation of the controller).

For the "DIAGNOSIS" position combination, it is more sensible to select a combination in which both of the operator's hands are required: one hand switches the controller on while the other hand operates an input element with an automatic return, for example a push-button switch. For the heating control, it is thus advantageous for the "DIAGNOSIS" position combination to comprise operation of the recirculation push-button 3. This ensures that the operator does not enter the diagnosis program accidentally. As further or alternative protection, it can be provided that, in order to enter the diagnosis program, the input elements must assume a position combination which makes little sense in normal operation of the main program 101, for example in which one temperature selection wheel 4.1 is latched at MAX and the other temperature selection wheel 4.2 is latched at MIN for the heating controller.

After entering the diagnostic program, at steps 102 faults which are currently occurring are recorded and stored in an area of the fault memory 6 provided for this purpose.

Subsequently, the basic diagnostic mode 103 is selected, in which the interrogations 104 and 108 are used continuously to interrogate the position of the input elements (temperature selection wheels 4.1 and 4.2 in FIG. 1), and to test whether one of the position combinations assigned to the fault classes I or II is present. For example, the position combinations "I" and "II" can be provided for the heating controller in FIG. 1 by both temperature selection wheels being latched on MAX and both of them on MIN, respectively. The basic mode 103 can in this case be displayed by characteristic flashing of the signalling element 2 provided for emission of flashing code, or by activation of a second signalling element which may be present (not shown).

If a position combination "I" assigned to the fault class I is identified in the interrogation 104 (e.g., both wheels 4.1, 4.2 at the MAX position), a first fault number, which is entered in the fault memory of the fault class I, is emitted by means of flashing code with the output I, step 105. This is followed by an interrogation 106, as to whether all the stored fault numbers have then been emitted. If so, the basic mode 103 is selected again. If all the fault numbers have not yet been read out, output I, step 105 is selected again and the subsequent, stored fault number is emitted. In this way, all the fault numbers of the fault class are emitted successively in rising sequence. The output can in this case take place in accordance with a predetermined timing, or it can be carried out by operation of a push-button (step 107). The recirculation push-button 3 is once again suitable for this purpose in the case of the heating controller in FIG. 1.

If, starting from the basic mode 103, a position combination "II" assigned to the fault class II is present in step 108 (e.g., both wheels 4.1, 4.2 at the MIN position), it is determined in step 109 whether the operating duration of the position combination "II" has exceeded a specific time, (for example 5 seconds). The operating duration is determined, as a rule, by the operating duration of the input element with automatic return, for example the recirculation push-button. In the event of a short operating duration (less than 5 seconds, for example), the fault numbers stored with respect to the fault class II are emitted in the steps 110–112, in a completely analogous manner to the emission of the fault numbers for fault class I in steps 105–107. However, in the event of a longer operating duration, the past faults, which are stored in the fault memory, for fault class II are erased.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for evaluating operability of a self-diagnostic system of a control unit in a motor vehicle, said control unit having a control panel with a push-button switch with automatic return, further positionable input elements, and a signal element for emitting a flashing code, said method comprising the steps of:

dividing types of faults which can be diagnosed into fault classes, each type of fault being assigned a fault number within a fault class;

an operator selecting a fault class by setting said positionable input elements to a predetermined position combination associated therewith;

said operator operating said push-button switch while said positionable elements are in said predetermined position combination; and said signal element emitting flashing code signals concerning status of the types of faults included in the selected fault classes.

2. Method according to claim 1, wherein the fault classes can be selected only in a basic diagnostic mode which is activated for the first time if the input elements are set to a specific position combination while a power supply of the controller is being switched on.

3. Method according to claim 2, wherein the specific position combination for initial activation of the basic diagnosis mode comprises a setting of said input elements in a position which is unexpected in normal use of the controller.

4. Method according to claim 3, wherein said specific position combination requires continuous operation with one hand.

5. Method according to claim 4 wherein said continuous operation comprises depressing a push-button switch.

6. Method according to claim 2, wherein after all the fault numbers which correspond to the faults which are present in a fault class have been emitted, a the process returns to the basic diagnosis mode.

7. Method according to claim 1, wherein if all the fault numbers corresponding to the faults present in a fault class have not yet been emitted, a fault number which has not yet been emitted is produced by operating the push-button switch.

8. Method according to claim 1, wherein a first fault class includes currently determined faults, and a second fault class includes faults which have occurred in the past and are stored in a fault memory.

9. Method according to claim 8, wherein if the push-button switch is operated for a time period which exceeds a preset limit value during selection of the fault class of the past faults, past faults stored in the fault memory are erased.

10. Method according to claim 2, wherein the basic diagnosis mode is also displayed either via the signalling element for flashing code emission or via a second signalling element.

11. Apparatus for evaluating operability of a self-diagnostic system of a vehicle heating control unit having a control panel with a push-button switch with automatic return for selecting an air recirculation mode, first and second temperature selection wheels, each having a MIN position and a MAX position, and a recirculation indicating lamp for emitting flashing code signals, said apparatus comprising:

a memory having stored therein a plurality of fault numbers, one such fault number corresponding to each type of fault which can be diagnosed, such types of faults which can be diagnosed being divided into two classes;

means for recognizing a selected class of faults in response operation of said push-button switch, with said temperature selection wheels being set to a predetermined position combination associated with said selected class of faults;

means for causing said recirculation indicating lamp to emit flashing code signals concerning status of the types of faults included in the selected class.

12. Apparatus according to claim 11, wherein said means for recognizing a selected class of faults responds to operation of said recirculation button only if a power supply of said heating control unit is switched on simultaneously therewith.

13. Apparatus according to claim 11, wherein said means for recognizing a selected class of faults responds to operation of said recirculation button only if a power supply of said heating control unit is switched on simultaneously therewith, with said first and second temperature selection wheels set in a predetermined position combination.

* * * * *